(12) United States Patent
Matthews et al.

(10) Patent No.: US 6,970,266 B2
(45) Date of Patent: Nov. 29, 2005

(54) FAULT NOTES USER INTERFACE FOR A PRINTING SYSTEM

(75) Inventors: David S. Matthews, Rochester, NY (US); Thomas A. Myers, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 944 days.

(21) Appl. No.: 09/767,449

(22) Filed: Jan. 23, 2001

(65) Prior Publication Data
US 2002/0097422 A1 Jul. 25, 2002

(51) Int. Cl.[7] .......................... B41B 13/00; B41F 1/00; G06F 15/00; G06K 1/00
(52) U.S. Cl. ..................... 358/1.16; 358/1.18; 358/1.9; 358/3.2
(58) Field of Search ............... 358/1.9, 9.2, 1.16–1.18, 358/3.2; 710/15–19

(56) References Cited

U.S. PATENT DOCUMENTS 5,852,436 A * 12/1998 Franklin et al. ............ 345/867
5,987,535 A * 11/1999 Knodt et al. ................. 710/15
6,128,017 A * 10/2000 Alimpich et al. ........... 345/808
6,504,556 B1    1/2003 Myers

OTHER PUBLICATIONS

Post-it Software Notes 2.0 Office Edition, 3M, www.3m.com/market/office/posit/com_prod/psnotes/, 1999, printed Nov. 19, 2000.

* cited by examiner

Primary Examiner—Thomas D. Lee
Assistant Examiner—James A. Thompson
(74) Attorney, Agent, or Firm—Fay, Sharpe, Fagan, Minnich & McKee, LLP

(57) ABSTRACT

A method and graphical user interface system provide fault notes in a printing system. A fault screen window is provided that depicts faults for individual supply unit devices and output unit devices which can be opened by selecting the fault button and/or fault icon. A fault notes window is also provided for user editable text linked to the fault screen window. The fault notes window displays only user editable text related to a selected device or displays only user editable text related to the system when no device is selected. A fault notes icon is configured to appear when user editable text has previously been entered on said fault notes window.

12 Claims, 3 Drawing Sheets

FAULT NOTES USER INTERFACE FOR A PRINTING SYSTEM

FIELD OF THE INVENTION

This invention is directed to a high capacity printing system, and more particularly to a user interface having device fault screens for displaying instructive information relating to devices that are in a fault status or have recently developed fault conditions.

BACKGROUND OF THE INVENTION

Present and future high capacity printing systems support high volume document production for commercial and printing center operations, with a wide range of input and finishing configurations. Further, operators are provided with many job programming options and selections in order to maintain an efficient usage of these printing systems.

In view of the complexity of these high capacity printing systems, and the user interfaces provided for their operation and control, it is to be expected that fault conditions will occur in supply unit devices and output unit devices. Most present high capacity printing systems provide a graphical user interface that informs an operator of these faults as they occur, and provides instructive information in fault screen windows providing the operator with the information necessary to know what the fault condition is and also how to correct the fault condition.

While existing fault screen windows inform the operator of faults and set forth corrective information, they do not provide a means for an operator to enter notes or reminders about a fault. For example, a particular brand of paper may be jamming in a particular feeder and the present operator has no convenient or effective way of electronically passing this information on to a future operator in following shifts, or as a reminder to himself/herself for the next work day. One way to accomplish this task is to place a paper sticky note on the device or on the user interface where it will be readily accessible and visible, however, this method is inconvenient, easily overlooked and contributes to clutter in the printing system area.

Therefore, there is a need for a system and method by which an operator of a high capacity printing system can efficiently and easily make notes about recurring faults on the system. Further, there is a need that these notes be accessible in a user editable window on the graphical user interface of the printing system. It is further desirable that these notes be relevant to the specific device upon which the fault has occurred, or relevant to the system if no specific device is involved. There is also a need that a fault note icon is automatically associated with any fault or machine condition, serving as an eyecatch and access method whenever an operator has entered fault notes relevant to that condition.

SUMMARY OF THE INVENTION

According to an aspect of the present invention, there is provided a method and graphical user interface system for providing fault notes to be used by a printing system. The system includes a view selection window containing a fault button for opening a window displaying recent faults that have occurred in the printing system. The system also includes a system window that provides an overall system view of the printing system, and includes a plurality of icons representing devices comprising the printing system. A fault icon is displayed in the proximity of the icon representing a device for each device having a fault condition. A fault screen window, depicting faults for individual supply unit devices and output unit devices, can be opened by selecting the fault button and/or fault icon. A fault notes window is provided for user editable text linked to the fault screen window. The fault notes window displays only user editable text related to a selected device or displays only user editable text related to the system when no device is selected. The fault notes window is accessed by selecting a notes button and/or a fault notes icon on the fault screen window. The fault notes icon is configured to appear when user editable text has previously been entered on said fault notes window.

A first advantage of the present invention is the provision for user editable text that can be entered by a user/operator relating to a specific fault or relating to the overall system.

Another advantage of the present invention is provision for a fault notes icon that is configured to appear automatically when user editable text exists, serving as an eyecatch, alerting a user to a problem or information relating to a specific device or the overall system.

Still further advantages of the present invention will become apparent to those of ordinary skill in the art upon reading and understanding the following detailed description of the preferred embodiment.

DESCRIPTION OF THE DRAWINGS

The present invention exists in the construction, arrangement, in combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 1:
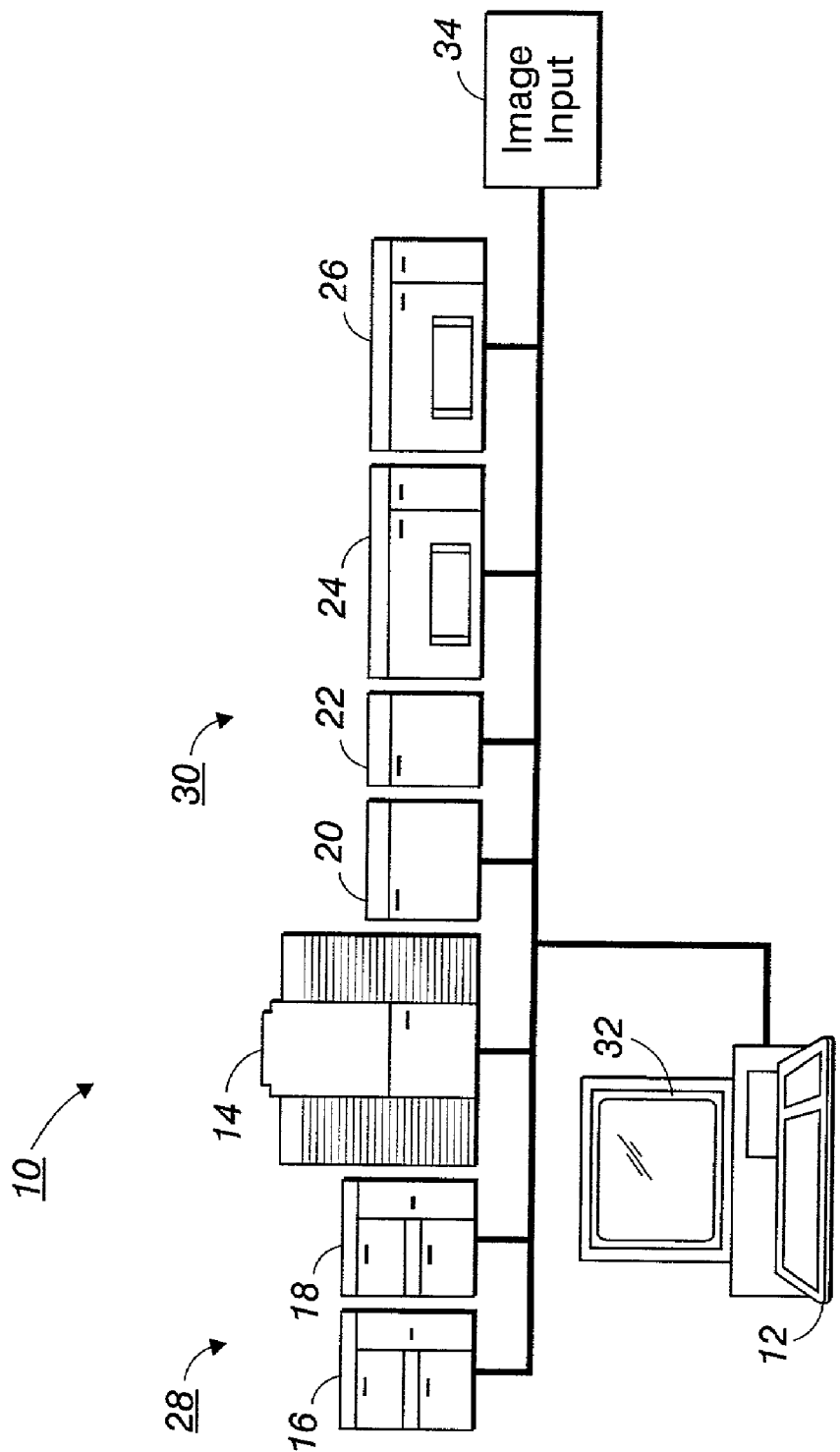
FIG. 1 shows a digital printing system suitable for incorporating an embodiment of the present invention.

Referring to FIG. 1, an exemplary digital printing system 10 in which an embodiment of the present invention is useful is shown. A user interface 12 is connected to print engine 14 which is in turn connected to feeders 16–18, and finishers 20–26. Feeders 16–18 are collectively referred to as supply unit 28 which may comprise 1 to M feeders, and finishers 20–26 are collectively referred to as output unit 30 which may comprise 1 to N finishers. Each of the feeders 16–18 includes one or more trays which forward different types of support material, such as paper, transparencies or other printable media, to print engine 14. Output unit 30 may comprise several types of finishers 20–26 such as inserters, stackers, staplers, binders, etc., which take the completed pages from print engine 14 and use them to provide a finished product. User interface 12 includes a display screen 32 for displaying information and instructions to a user of system 10.

Also included in printing system 10 is an image input source 34 from which printing system 10 receives image data in the form of digital image signals that can be processed by print engine 14. The digital image signals are received by printing system 10 by way of a suitable communication channel such as a computer cable, ISDN line, telephone line, etc. Other remote sources of image data such as floppy disks, hard disks, magnetic tapes, CD discs, storage mediums, scanners, etc. may be envisioned.

The configuration of system 10 as shown in FIG. 1 is for exemplary purposes only. The present invention is suitable for any apparatus comprising a plurality of interconnected devices and a user interface with a display screen wherein each device can potentially develop one or more fault conditions that a user would typically be informed of, and wherein it would be desirable that the user could enter notes as a reminder to himself/herself or for later reference by another operator.

Figure 2:
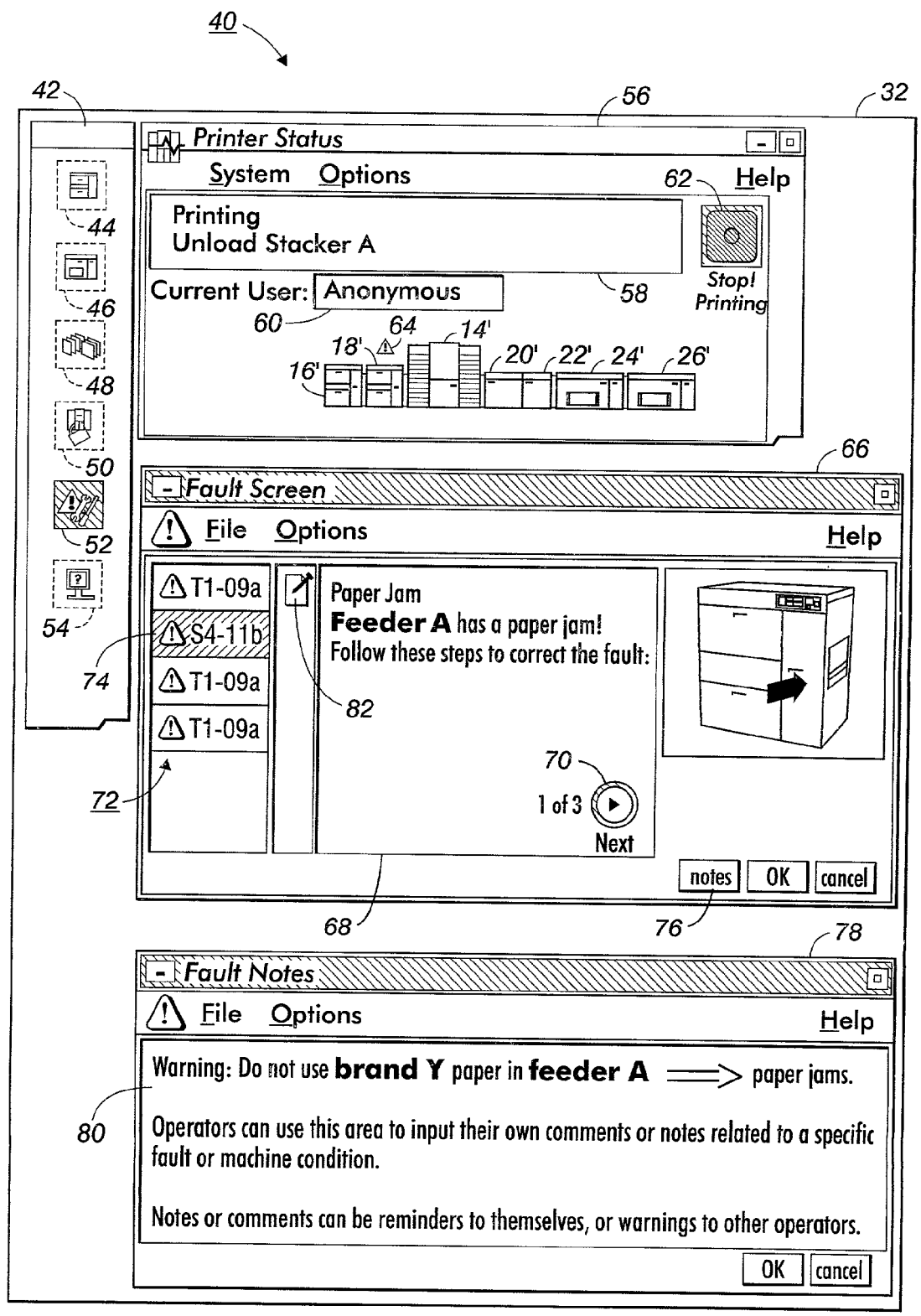
FIG. 2 illustrates a graphical user interface screen of the present invention with a fault notes window opened.

With reference now to FIG. 2, and continuing reference to FIG. 1, a graphical user interface screen 40 is displayed in part, substantially as it would appear on display screen 32, to illustrate features of the present invention. View selection window 42 displays icon buttons 44–54 which, when individually selected by one of many methods well known in the art, open windows that provide views of devices or features of digital printing system 10. For example, button 44 opens a window that provides a view of feeders attached to the printing system such as feeders 16 and 18. Button 46 similarly opens a window that provides a view of finishers attached to the printing system such as finishers 20–26. Button 48 opens a stock view displaying information relative to each type of printing stock available to printing system 10. Button 50 opens a window providing access to system administration functions. Fault button 52 opens a window displaying recent faults that have occurred in printing system 10. Button 54 provides access to a help screen that explains features and operating instructions for digital printing system 10.

Also shown on display screen 32 is system window 56 that provides an overall system view of printing system 10. Text box 58 displays information on current activity and any required operator interventions. Text box 60 displays the name of the current user of printing system 10. Button 62 alternately stops and starts printing system 10.

An icon representation 14' of print engine 14 is provided in system window 56 as are feeder icon representations 16' and 18', and finisher icon representations 20'–26'. The presence of fault icon 64 above feeder icon 18', symbolically referred to as feeder Mozart, indicates that a fault has occurred on feeder 18 and is in need of operator intervention. Selecting fault icon 64 is one of several means of accessing fault screen window 66 shown below system window 56.

Fault screen window 66 provides information relevant to faults that occur within supply unit 28 and output unit 30 such as, for example, paper jams, empty supply trays, etc. In this example, text box 68 indicates that feeder Mozart has a paper jam where Mozart, as mentioned above, is the symbolic name of feeder 18. Additional instructions relative to each type of fault can be accessed by selecting next button 70. Fault indicators existing for other supply unit devices or output unit devices can also be accessed by selecting one of the device fault buttons 72. In this example, button 74 was automatically preselected when fault icon 64 was selected. The current device fault button selection is highlighted by shading on the left side and topside of the button as illustrated for button 74.

While the messages displayed in text box 68 are useful and informative to a user, they are preconfigured in software and are not modifiable by a user. It is becoming increasingly necessary in complex systems to provide a means for a user to provide additional configuration and information tailored to a specific installation or specific conditions. For example, in pending U.S. application Ser. No. 09/342373 filed Jun. 29, 1999, incorporated by reference herein, a notation tool tip is disclosed so that an operator can reference stock using his or her own system rather than relying on the stock identification provided by the manufacturer.

The present invention provides user annotations in the form of fault notes associated with each device comprising supply unit 28 and output unit 30. In the present example, if the user wanted to add a remark, warning other operators/users about a particular brand of paper that is causing paper jams in feeder Mozart, he/she could select notes button 76 in fault window 66, which would open fault notes window 78. Included in notes window 78 is notes text box 80 for user editable text in which users are permitted to enter freeform text describing problems and solutions as reminders to themselves or as comments to other users of printing system 10. For example, in this case, the user might want to add a comment such as "Warning: Do not use brand Y paper in Mozart→ paper jams." A comment added in this manner will be persistent and accessible by any user accessing the fault screen window 66. If no fault notes have previously been entered for the selected device, a blank/empty fault notes text box 80 is presented to the user in window 78 so that notes can be entered by the user for future reference. Existing notes can be deleted by any well known word processing means.

While one navigational method for accessing fault screen window 66 and fault notes window 78 has been described, there may be a plurality of navigational methods for accessing these windows. In the previously described method, a user selected fault icon 64 above icon 18' representing feeder Mozart. This selection caused fault screen window 66 to open with button 74 preselected for feeder Mozart in order to automatically present fault diagnostic text in box 68. The user then selects notes button 76 to access fault notes window 78 for feeder Mozart. Printing system 10 may also be configured such that fault notes window 78 opens automatically whenever a device with existing fault notes is selected in fault screen window 66 by selection, automatically or manually, by one of device fault buttons 72.

Another method of accessing fault notes window 78 is by selecting fault note icon 82. Selecting this icon opens a fault notes window 78 that is associated with the currently selected device fault button 72. Fault note icon 82 will be configured to appear anytime a device is selected for which an operator has entered fault notes in box 80. This icon will also appear in any dialogs associated with the selected device when fault notes have previously been entered relevant to that device. The icon can also be configured to appear whenever no device has been selected and fault notes related to printing system 10 have previously been entered by an operator.

It is also possible that no device button 72 is previously selected when selecting fault note icon 82. In this case, it would be desirable that a system fault note window 78 is opened so that a user can enter notes in text box 80 that are not associated to any particular device. For example, a note might be entered saying "System maintenance is scheduled for noon today." Another example might be "Paper stock XYZ causing problems, try not to run this stock."

The above-described fault notes can be compared to paper sticky notes. For example, in the embodiment just described, a user might place a sticky note on feeder Mozart to alert other users, or as a reminder to himself/herself that feeder Mozart has a problem with specific types of paper stock. Or, as another example, a user might place a paper sticky note on user interface 12 as a reminder that system maintenance is scheduled at a specific time. It is beneficial, however, to have similar electronic capabilities programmed into the software controlling printing system 10 so that notes are readily available in a consistent manner rather than in the substantially haphazard, inconsistent and somewhat messy manner of paper sticky notes.

Figure 3:
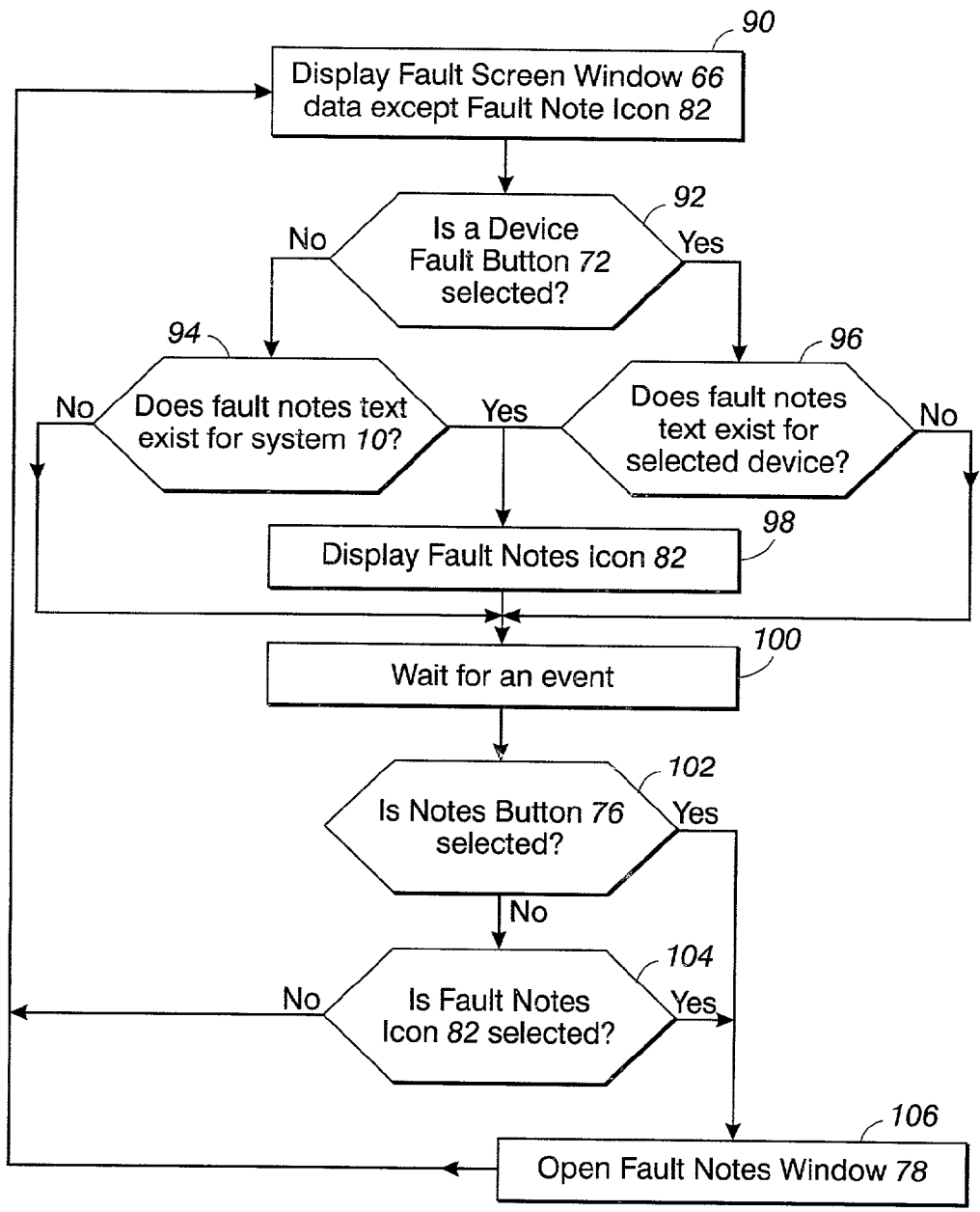
FIG. 3 is a flowchart depicting software navigation from a fault screen window to a fault notes window.

In order to make the navigation from fault screen window 66 to fault notes window 78 more clear, a flowchart is provided in FIG. 3. In this flowchart, it is assumed that fault screen window 66 is already opened, and is being filled in at step 90 by software configured to operate on printing system 10. At step 92 a query is made as to whether one of device fault buttons 72 is selected. If the answer is negative, a query is made at step 94 as to whether fault notes text exists related to printing system 10 in general, otherwise a query is made at step 96 as to whether fault notes text exists for the selected device in particular. If either query at step 94 or step 96 is in the affirmative, fault note icon 82 is displayed in window 66 at step 98, otherwise processing continues at step 100.

At step 100, no further processing takes place except to wait for any event to happen that has an effect on the display of fault screen window 66 or a selection of a button or icon on window 66 has occurred. In this case, step 102 makes a query regarding notes button 76 to determine if it has been selected and, if not, further query is made at step 104 to determine if fault icon 82 has been selected. If neither query is in the affirmative, processing returns to step 90 to refresh fault screen window 66. If either query is in the affirmative, processing proceeds to step 106 where fault notes window 78 is opened for user input and processing then returns to step 90 for refresh of fault screen window 66.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

We claim:

1. A graphical user interface system for providing fault notes associated with a related printing system, comprising:
    a view selection window on a display screen and including a fault button;
    a system window spaced from said view selection window on said display screen, wherein said system window provides an overall system view of said printing system, said system window including:
        a plurality of system component icons, each system component icon representing an individual component of said printing system, including supply unit and output unit devices; and
        a fault icon corresponding to each individual component of said printing system having a fault condition, wherein each fault icon is displayed in the proximity of a corresponding system component icon;
    a fault screen window spaced from said view selection window and said system window on said display screen and displaying recent faults that have occurred in said printing system, wherein said fault screen window is opened by selecting at least one of said fault button and any said fault icon;
    a fault notes window spaced from said view selection window, said system window, and said fault screen window on said display screen and including a text box for accepting and displaying user editable text, said fault notes window being linked to said fault screen window;
    multiple device fault buttons, each device fault button associated with a corresponding fault icon and individual component of said printing system; and
    at least one of a notes button and a fault notes icon, wherein said fault notes window is linked to said at least one of said notes button and said fault notes icon.

2. The system as set forth in claim 1, wherein a first device fault button of said multiple device fault buttons is selected and said text box is related to said first device fault button.

3. The system as set forth in claim 1, wherein none of said multiple device fault buttons are selected and said text box is related to said printing system.

4. The system as set forth in claim 1, wherein said fault notes window is accessed by selecting at least one of said notes button and said fault notes icon.

5. The system as set forth in claim 1, wherein said fault notes icon is configured to appear when user editable text has previously been entered in said text box.

6. The system as set forth in claim 1, wherein said fault notes window is opened automatically in response to selection of a first device fault button of said multiple device fault buttons and said text box is related to said first device fault button.

7. A method for providing user editable fault notes in a printing system, comprising the steps of:
    displaying a fault screen window on a display screen associated with said printing system, said fault screen window including multiple device fault buttons, each device fault button corresponding to an individual component of said printing system;
    displaying a fault notes window spaced from said fault screen window on said display screen in linked relation to said fault screen window, said fault notes window including a text box;
    displaying a view selection window spaced from said fault screen window and said fault notes window on said display screen and including a fault button, wherein selection of said fault button opens said fault screen window;
    displaying a system window spaced from said fault screen window and said fault notes window on said display screen, wherein said system window provides an overall system view of said printing system, and wherein said system window includes, i) a plurality of system component icons, each system component icon representing an individual component of said printing system and corresponding to an individual device fault button of said multiple device fault buttons, and ii) a fault icon corresponding to each individual component of said printing system having a fault condition, wherein each fault icon is displayed in the proximity of a corresponding system component icon, wherein selection of any said fault icon opens said fault screen window;
    accepting user editable text in said text box; and
    displaying user editable text in said text box.

8. The method as set forth in claim 7, wherein said fault screen window includes a note button and said fault notes window is accessed by selecting said notes button.

9. The method as set forth in claim 7, wherein said fault screen window includes a fault notes icon and said fault notes window is accessed by selecting said fault notes icon.

10. The method as set forth in claim 9, wherein said fault notes icon is configured to appear when user editable text has previously been entered in said text box.

11. The method as set forth in claim 7, wherein a first device fault button of said multiple device fault buttons is selected and said text box is related to said first device fault button.

12. The method as set forth in claim 7, wherein none of said multiple device fault buttons are selected and said text box is related to said printing system.

* * * * *